No. 687,213. Patented Nov. 26, 1901.
T. A. ENNIS.
SCALE.
(Application filed Apr. 20, 1901.)
(No Model.)
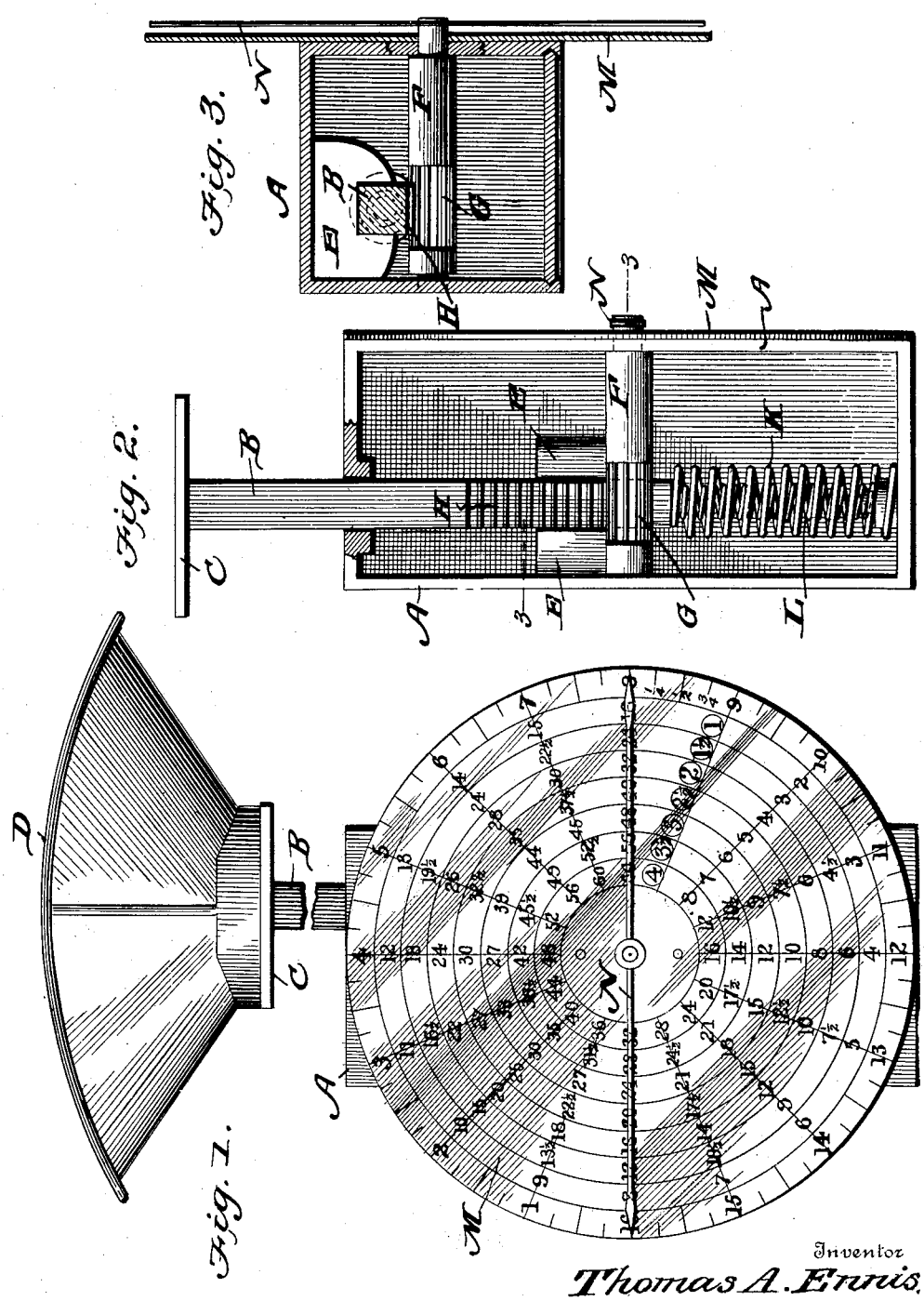
Inventor
Thomas A. Ennis.
Witnesses

UNITED STATES PATENT OFFICE.

THOMAS A. ENNIS, OF ALREAD, ARKANSAS.

SCALE.

SPECIFICATION forming part of Letters Patent No. 687,213, dated November 26, 1901.

Application filed April 20, 1901. Serial No. 56,716. (No model.)

*To all whom it may concern:*

Be it known that I, THOMAS A. ENNIS, a citizen of the United States, residing at Alread, in the county of Van Buren and State Arkansas, have invented a new and useful Scale, of which the following is a specification.

This invention relates generally to scales, and more particularly to a spring-scale; and the object of the invention is to provide an exceedingly cheap and simple construction of spring-scales which shall have a computing attachment arranged in connection therewith, whereby the weight shall be indicated and also the aggregate prices of the article weighed computed.

With this object in view the invention consists in the peculiar construction of the various parts and in their novel combination and arrangement, all of which will be fully described hereinafter and pointed out in the claim.

In the drawings forming a part of this specification, Figure 1 is a face view of an apparatus constructed in accordance with my invention, the standard being broken away. Fig. 2 is a sectional view, and Fig. 3 is a section taken on the line 3 3 of Fig. 2.

In carrying out my invention I employ a suitable casing A, in which slides the standard B, carrying the pan C at its upper end for the purpose of supporting the bowl D. The standard B is square in cross-section and works in the guide E, arranged within the case about midway its height. An arbor F is journaled horizontally in the case A and carries the pinion G intermediate its ends, which pinion is adapted to engage the rack-teeth H, produced upon the standard B, the guide E serving to hold the rack and pinion in positive engagement. The lower end of the standard is supported by means of the spiral spring K, which is depressed whenever anything is weighed, and in order to compensate for the weight of the standard, the pan, and bowl I arrange a supplemental spiral spring L within the main spring K, so that the weight of the parts before mentioned is compensated for, thereby relieving the spring K of this weight. The outer end of the arbor F passes through the dial M and carries on its outer end a double indicator or pointer N, the ends of said pointer or indicator extending approximately to the edges of the dial, as most clearly shown in Fig. 1. The face of the dial is divided both circumferentially and radially, the outer edge being marked off to indicate pounds, and in the present construction the dial is made to indicate pounds from one to sixteen, inclusive, and it will of course be understood that the zero-mark and numeral "16" occupy the same position, the inner portion of the dial containing the concentric series of price-marks, and in the present instance I have arranged these prices in multiples of "1," "1½," "2," "2½," "3," "3½," and "4." These multiples are preferably arranged upon a line diametrically opposite the line passing through the numeral "1," indicating one pound. The left-hand pointer or indicator points to or indicates the number of pounds weighed, and the right-hand pointer or indicator points to or indicates the prices of the article. Thus, supposing that an article selling for four cents per pound is weighed and is found to weigh five pounds, the double indicator will turn around until the left-hand end stops at the numeral "5," while the right-hand end will stop at the numeral "13," and by locating the multiple "4," which is the price per pound, and following it around to the pointer or indicator the numeral "20" will be indicated, thus automatically computing and indicating the price of the article weighed. As soon as the article weighed has been removed the spring will of course return all the parts to their normal position, as indicated in Fig. 1. It will thus be seen that I provide an exceedingly cheap, simple, and efficient construction of double spring-scales.

Having thus fully described my invention, what I claim as new, and desire to secure by Letters Patent, is—

The combination with the case, of the standard arranged therein square in cross-section and having rack-teeth upon one side, the guide within the case and in which the standard works, the arbor journaled in the case and having a pinion meshing with the rack-teeth, the main spring arranged within the case and beneath the standard, the supplemental spring arranged within the main spring, the double-pointed indicator arranged upon the exterior end of the arbor and the dial arranged upon the exterior of the case, said double-pointed indicator being arranged centrally of the said dial, substantially as described.

THOMAS A. ENNIS.

Witnesses:
R. M. EMERSON,
H. L. LEONARD.